US008025195B2

(12) United States Patent
Robichaux et al.

(10) Patent No.: US 8,025,195 B2
(45) Date of Patent: Sep. 27, 2011

(54) ENERGY GEL PACK CLAMPING FIXTURE

(76) Inventors: Jason Anthony Robichaux, Fresh Creek (BS); Bradley Keith Ward, Little Rock, AR (US)

(*) Notice: Subject to any disclaimer, the term of this patent is extended or adjusted under 35 U.S.C. 154(b) by 828 days.

(21) Appl. No.: 12/148,555

(22) Filed: Apr. 21, 2008

(65) Prior Publication Data
US 2009/0261135 A1 Oct. 22, 2009

(51) Int. Cl.
*A45F 3/16* (2006.01)
*A45F 5/00* (2006.01)
*A55F 3/18* (2006.01)
*B62J 7/00* (2006.01)
*B62J 9/00* (2006.01)

(52) U.S. Cl. .............. 224/414; 224/148.4; 224/148.6; 224/148.7; 224/448; 224/461

(58) Field of Classification Search ............... 224/414, 224/148.4, 148.6, 148.7, 448, 456, 461, 558, 224/570
See application file for complete search history.

(56) References Cited

U.S. PATENT DOCUMENTS

| | | | | |
|---|---|---|---|---|
| 4,386,721 A * | 6/1983 | Shimano | ............... | 224/414 |
| 4,998,652 A * | 3/1991 | Champagne | ............ | 224/414 |
| 5,040,709 A * | 8/1991 | Neugent | ............... | 224/414 |
| 5,056,696 A * | 10/1991 | Lahr | ............... | 224/148.4 |
| 5,145,138 A * | 9/1992 | Schlanger et al. | ......... | 248/311.2 |
| 5,232,137 A * | 8/1993 | Devine | ............... | 224/666 |
| 5,301,860 A * | 4/1994 | Paczonay | ............ | 224/414 |
| D455,707 S * | 4/2002 | Sartore | ............... | D12/411 |
| 6,409,048 B1 * | 6/2002 | Belzeski | ............ | 222/103 |
| 6,820,770 B2 * | 11/2004 | Makino et al. | ......... | 222/180 |
| 6,932,255 B2 * | 8/2005 | Van Houtte | ............ | 224/414 |
| 7,156,353 B2 * | 1/2007 | Kringel et al. | ......... | 248/311.2 |
| 2004/0256428 A1 * | 12/2004 | Meggiolan | ............ | 224/414 |

* cited by examiner

*Primary Examiner* — Justin Larson
*Assistant Examiner* — Lester L Vanterpool

(57) ABSTRACT

The energy gel pack clamping fixture is a device used for fixably securing multiple gel packs in a central and convenient location about the horizontal tube member just behind the handlebar stem of bicycles. The fixture includes a central rail flame having an arrangement of integrally molded compression gland grooves and mounting tabs on both ends where adjustable cable tie wraps secure the rail about the tube member. A gel pack is secured about the rail frame by positioning the tear-off tab over the gland depression such that the tearing axis lies along the lateral edge of the gland. A snap clamp piece is oriented and pressed about the top of the tear-off tab then forcibly inserted into the mating gland while deforming the tab in place. The snap clamp piece locks in place when deflectable insertion tab arms become seated beneath the lower edge of the rail flame receiving slots. In this manner, repeated for each of multiple packs, the fixture facilitates central mounting and tear opening of energy gel packs in a repeatable and quick fashion.

8 Claims, 4 Drawing Sheets

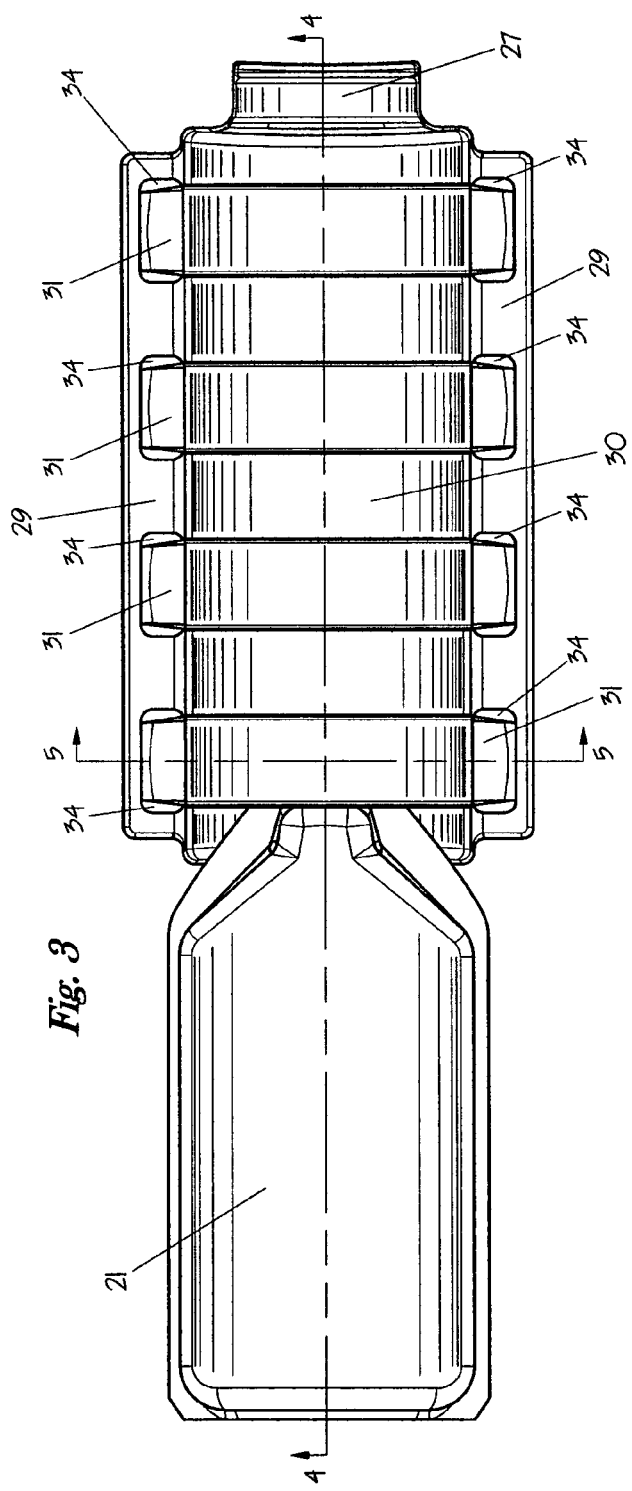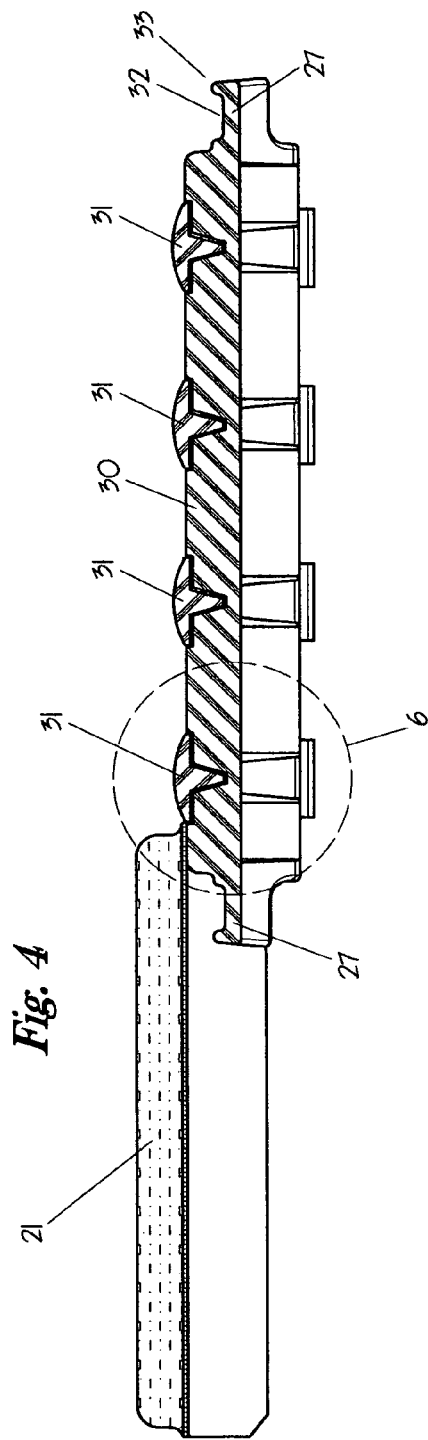

ENERGY GEL PACK CLAMPING FIXTURE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

Participation in extended distance bicycling activities, whether it be for competitive or exercise purposes, confronts the riders with physiological challenges. Particularly, the amount of calories expended by the rider can frequently result in an energy deficiency before the completion of the race or trip. To address this problem, riders periodically consume measured quantities of an electrolytic/carbohydrate rich solution that come in single serving packets available for purchase from many different suppliers.

When a race or exercise trip exceeds an hour in duration, it is not uncommon for the rider to consume multiple energy gel packs while riding. Particularly, in competitive racing events, riders may consume four or more packs while on the bicycle. As a result, it is necessary for the rider to have a mechanism for transporting multiple energy packs either on their person or mounted somehow to the bicycle. When the packs are stored in pockets or pouches integral to the rider's body or clothing, retrieval can prove to be inefficient, time-consuming, and, in some cases, unsafe when traveling at high speeds or over uneven terrain. Furthermore, retrieval from pockets or pouches may cause the rider to assume an unwanted position about the bicycle resulting in increased wind drag that is detrimental during timed events such as races or competitions. Finally, gel packs transported in a loose fashion within pockets or pouches result in two separate pieces upon opening, namely, the tear off tab and the remaining empty packet. The rider normally releases the tear off tab to the ground creating unnecessary litter.

A common method of securing the packs directly to the bicycle employs the use of electrician's tape. Typically, the gel pack is placed on top of the horizontal tube frame member just behind the handlebar stem. The electrician's tape is wrapped tightly over the tear off tab of the gel pack and around the tube member multiple times. This normally is a difficult and time consuming endeavor since the gear shift and rear brake cables are commonly routed just below the tube member to which the packs are taped requiring the tape to be woven between the cables and the tube member for each successive wrap. Upon completion of a race or exercise period, the rider must remove the tape and leftover tear off tabs from the frame before a new set of gel packs can be secured. Installation and subsequent removal of the tape creates waste, leaves behind an adhesive residue on the surface of the frame tube member, and can potentially result in damage or inconsistent performance of the gear shift and rear brake cables.

The present invention provides for a semi-permanently installed, multi-grooved, central clamping rail unto which up to four individual gel packs can be securely fastened in an area convenient to the rider directly behind the handlebar stem. By locating and securing the mounting rail in an area forward of the rider and adjacent to the handlebars, increased wind resistance and aerodynamic drag is minimized by keeping the rider in a crouched position during gel pack access and opening. While utilizing quick, snap action compression clamps about the central rail, the tear off tabs of the gel packs are locked in place and remain captured after the gel pack is torn free and opened for consumption. Since no tape or other adhesive backed material is used during installation and securing of either the rail, clamps, or gel packs, waste and residue deposits on the bicycle are eliminated. Finally, as an alternative design feature, this invention also may utilize a hinged snap clamp resulting in a fully contained and interconnected gel pack clamping fixture assembly.

BRIEF SUMMARY OF THE INVENTION

This invention is directed to a clamping fixture assembly that is comprised of a central rail piece having up to four integrally molded compression gland grooves with associated pairs of receiving slots arranged on either end of the gland along the longitudinal axis and up to four identical snap action compression clamps, each equipped with a mating compression surface geometrically arranged and oriented to fit into the gland grooves and also comprised of integrally molded deflectable insertion tab arms arranged on either end of the clamp along the longitudinal axis. The compression clamp insertion tab arms engage through the lower end of the receiving slots while deflecting inward of their relaxed orientation and extend beyond until they engage against the bottom surface of the central rail edges, returning back to their relaxed position creating a positive locking position. The clamps engage the rail glands in a manner such that they snap lock into place while maintaining a maximum gap between the compression gland mating surfaces that is slightly less than the thickness of an energy gel pack tear off tab, thus creating a compression load about the tear off tab upper and lower surfaces. The central rail is semi-permanently secured to the bicycle frame using a flexible and lockable wrapping strap such as adjustable cable tie wraps. The cable ties encircle the bicycle frame tube member with the integrally molded mounting tabs on either end of the central rail piece situated under the cable tie loop inner surface and against the upper surface of the frame tube member. Using this arrangement of components, this invention thus facilitates quick assembly and securing of the gel packs about the bicycle and improves the efficiency of access and usage by the rider.

It is therefore a principle object of the present invention to provide a platform unto which multiple gel packs, up to four each, may be mounted and secured in a manner that is conveniently accessible by the rider in a location adjacent to the rear of the handlebar stem post and in front of the rider.

It is another principle object of the present invention to provide a method of securing the said mounting platform to a bicycle in a manner that is quick, reliable, adjustable and removable.

It is another principle objective of the present invention to provide a means of opening a gel pack that eliminates litter resultant from the loose detachment of the tear tab from the gel pack.

It is another principle objective of the present invention to provide a means of securing a gel pack to a bicycle that eliminates the usage and waste of electrician's tape, the subsequent potential for damage to and inoperability of the rear brake cable and gear shift cables, as well as the resultant adhesive residue that is left behind on the bicycle frame surfaces.

It is another principle objective of the present invention to provide a means of securing the gel packs that utilizes a simple, snap in place compression clamp for quick and reliable loading by the rider while ensuring that a capable grip pressure is placed upon the surfaces of the tear off tab such that the pack can be torn free with a one handed motion while the tear off tab remains secured about the mounting rail beneath the compression clamp.

It is another principle objective of the present invention to provide a platform for mounting multiple gel packs that is lightweight, durable, weatherproof, rigid, and compact.

It is another principle objective of the present invention to reduce or minimize the occurrence of wind resistance and aerodynamic drag by keeping the rider in a crouched riding position while accessing and opening the gel packs.

It is another principle objective of the present invention to provide a platform for mounting multiple gel packs that reduces or minimizes increased wind resistance and aerodynamic drag resultant of the physical shape, orientation, and location of the mounting platform for multiple gel packs.

It is another principle objective of the present invention to provide a platform for mounting a wide range of multiple gel packs with regards to variations in shape and packaging layout from multiple independent gel pack manufacturers.

BRIEF DESCRIPTION OF THE SEVERAL VIEWS OF THE INVENTION

FIG. 3 is a top plan elevation view of the invention with one gel pack loaded.

FIG. 4 is a section view of the invention in the direction of arrows 4-4 in FIG. 3.

DETAILED DESCRIPTION OF THE PREFERRED EMBODIMENT

Figure 1:
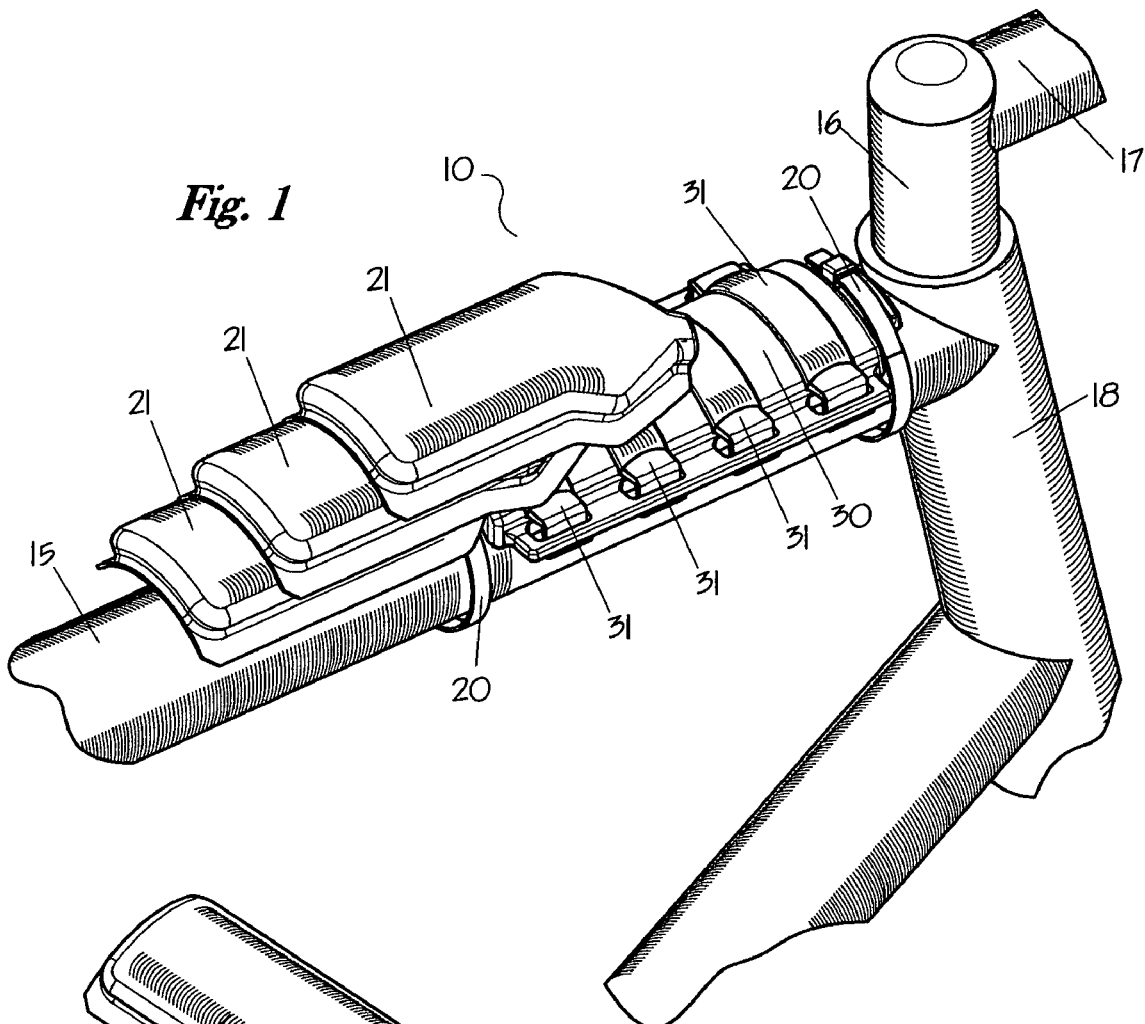
FIG. 1 is a top perspective view of the invention as mounted in place on the bicycle with three of four possible gel packs clamped in place.

Referring now to the drawings and firstly to FIG. 1, the invention is shown generally at numeral 10. The invention 10 is positioned about the bicycle preferably along the top surface of the horizontal frame tube member 15 just behind the handlebars 17 and handlebar stem post 16 and above the vertical frame tube member 18. The use of flexible and lockable wrapping straps such as adjustable length cable ties 20 fixably secures the invention to the bicycle, allows for adjustability, and enables the rider to remove the invention when necessary. Multiple energy gel packs 21 can be secured about the invention by being aligned and stacked on top of each other in a staggered and overlapped pattern thus creating a streamlined profile.

Figure 2:
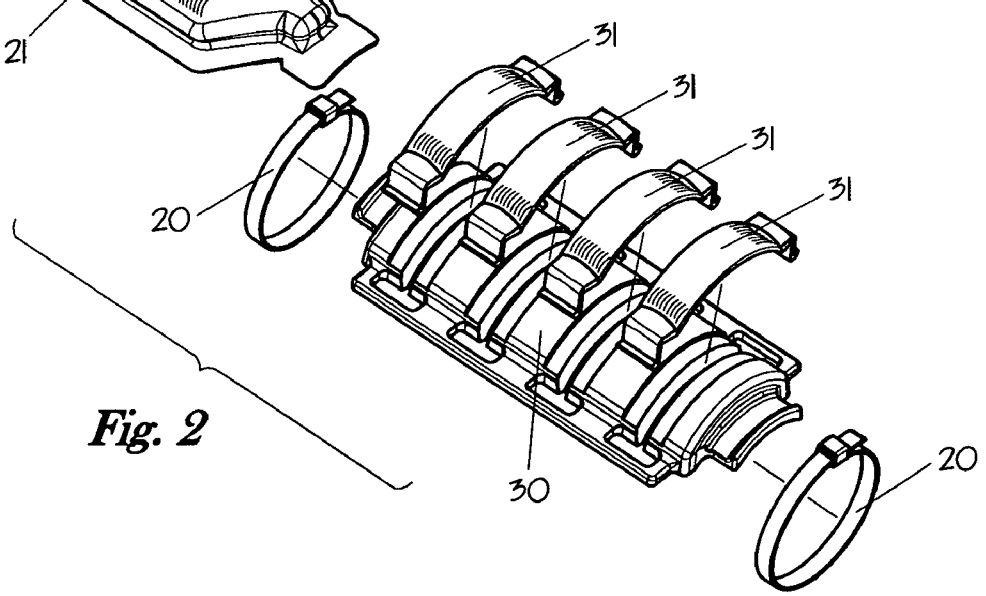
FIG. 2 is an exploded view of the invention prior to mounting on the bicycle and loading of a single gel pack.
Figure 5:
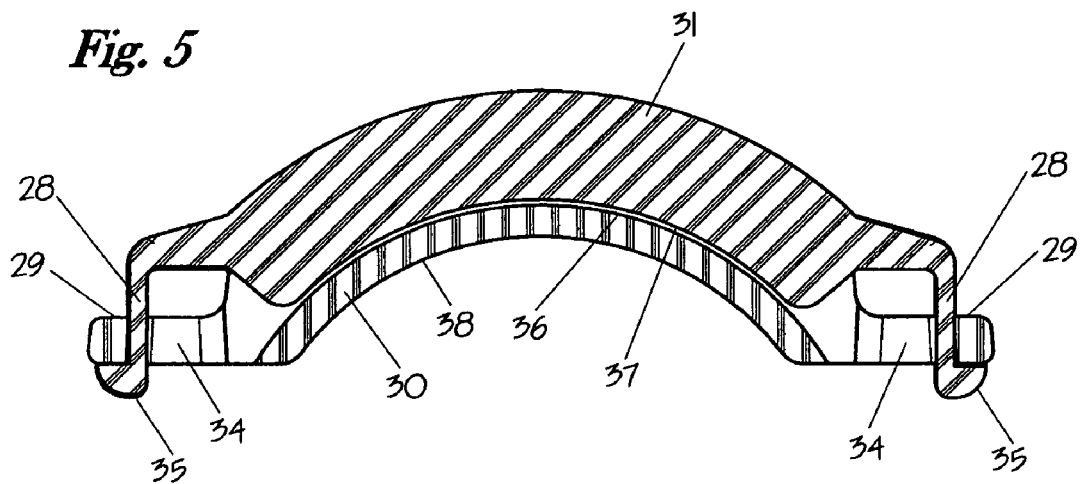
FIG. 5 is a section view of the invention in the direction of arrows 5-5 in FIG. 3.

Referring to FIG. 2, this energy gel pack clamping fixture includes a central rail member 30 that is preferably manufactured through a plastic injection molded process that generates all geometries and design features of the central rail member in one operation. The central rail member 30 is generally described as a thin rectangular solid having an arcing curvature on the upper and lower surfaces prescribed by a generalized outer diameter possessed by the horizontal frame tube member 15 of typical bicycles. The lower curvature 38 of the central rail 30 allows for a straddling fit along the upper surface of the horizontal tube frame 15. The upper curvature is sized as a consistent offset in a manner that dictates a generalized uniform cross sectional thickness of the central rail along the entire longitudinal length as illustrated in FIG. 5. The upper curvature of the central rail 30 allows for a curved surface against which the energy gel packs 21 lie, thus presenting a streamlined profile into the direction of air flow across the top as well as providing for the first axis of deformation of the energy gel packs 21 which will be further described here below.

Figure 6:
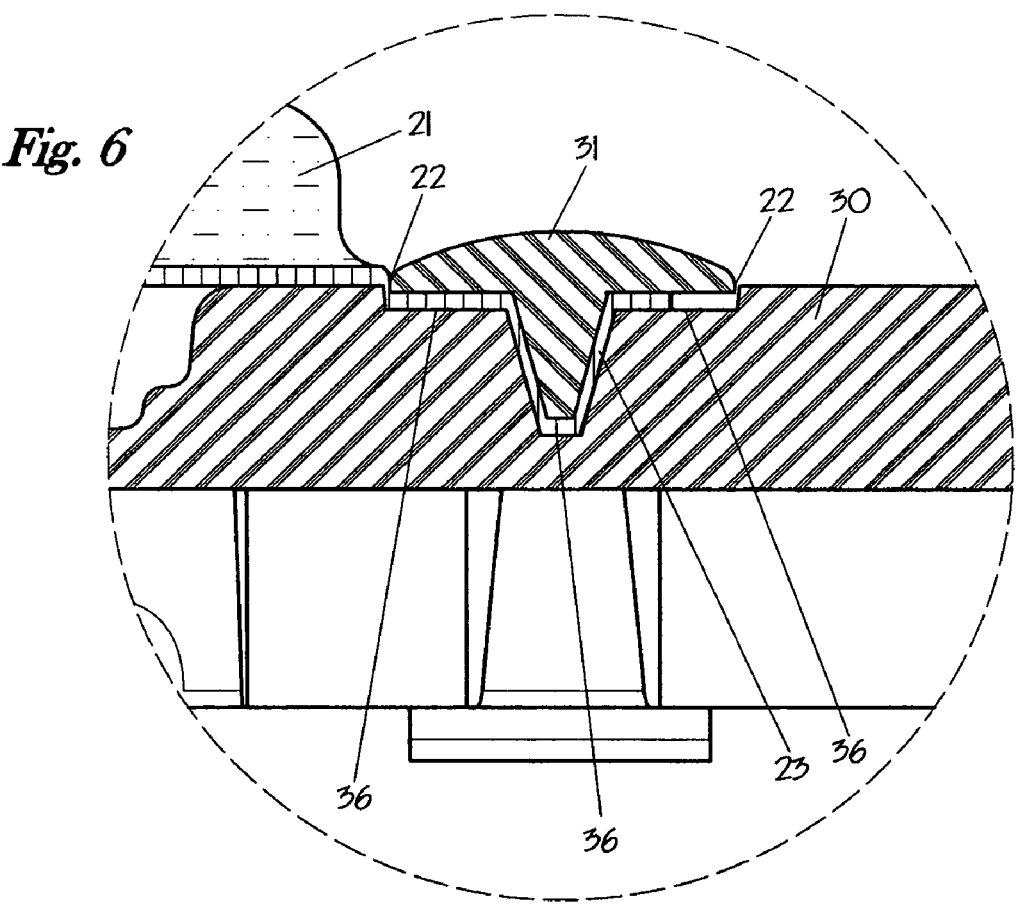
FIG. 6 is a detail view of the invention's clamping gland highlighted in FIG. 4.

Referring additionally to FIGS. 4 and 6, the central rail 30 includes integrally molded compression gland cavities bounded at the resultant central rail upper gland surfaces 36, each of which copied in an exact fashion and spaced at equal intervals along the longitudinal length of the central rail 30. The cross sectional gland recess profile is radially swept about the longitudinal axis in a continuous fashion along the entire upper curvature of the central rail 30. The gland recess profile presents a symmetrical v-shaped path with horizontal shoulder edges on both ends creating an upper gland surface 36 that imparts no fewer than four changes of direction upon the gel pack tear tab 23 when compressed and deformed under the compression load of the snap action compression clamp 31. These direction changes occur across the gel pack's second axis of deformation resulting in a complex combination of compressed bearing surfaces oriented in different planes imparted upon the top and bottom surfaces of the gel pack tear tab 23, thus creating a pull resistant grip.

Referring additionally to FIGS. 3 and 5, the longitudinal edges of the central rail member 30 on each side have an equally spaced set of integrally molded receiving slot cavities 34 encased by a continuous shoulder rail edge 29. The receiving slot cavities 34 occur in matched pairs aligned on either end of each successive compression gland groove along the length of the central rail member where the total number of pairs of receiving slots 34 is dictated by the number of respective compression gland grooves. Each receiving slot 34 is sized and arranged on the shoulder rail edge 29 in a manner that imparts an inward pinching deflection to the opposing insertion tab arms 28 of each engaged snap action compression clamp 31 during insertion and loading. The combination of the bottom surface of the shoulder rail edge 29 and the adjacent receiving slot cavity interior edge serves as an insertion tab arm shoulder catch 35 which effectively locks the snap action compression clamp 31 in place about the central rail member 30.

The central rail member 30 includes integrally molded mounting tabs 27 on both ends along the longitudinal centerline of the part. Referring to FIG. 4, each mounting tab 27 is described by the inclusion of a cable tie groove 32 sized to provide a mounting surface slightly larger than the width of a cable tie 20 and runs perpendicular to the direction of the longitudinal axis of the central rail member 30. The outside edge of the cable tie grove 32 mounting surface is bounded by a raised shoulder edge stop 33 such that the cable tie 20 cannot slide past the end of the mounting tab. The mounting tab lower surface profile is a seamless continuation of the lower curvature 38 of the central rail 30.

The mating component to the central rail member 30 is the snap action compression clamp 31 which is preferably manufactured through a plastic injection molded process that generates all geometries and design features of the compression clamp in one operation. The invention includes as many instances of the compression clamp 31 as there are compression gland grooves molded into the central rail member 30, also dictating the number of gel packs 21 that may be secured about the invention at one time. As illustrated by FIGS. 1-6, the compression clamp 31 presses against, deforms, and secures the gel pack 21 into the mating compression gland groove about the central mounting rail 30. The cross sectional profile of the central section of the compression clamp 31 is arranged to suitably fit into the compression gland groove in a manner such that the maximum gap between the lower contact surface 37 of the compression clamp 31 and the central rail upper gland surface 36 is less than the typical non-compressed thickness of the gel pack tear tab 23. Multiple lower surface rib grips 39 further individually engage and deform the gel pack tear tabs 23. The compression clamp tearing edge 22 is located at either extreme end of the compression gland groove and is aligned with the tear line of the gel pack 21, thus creating the decisive pinch point of contact necessary for removal of the tear tab 23 from the gel pack body.

Figure 7:
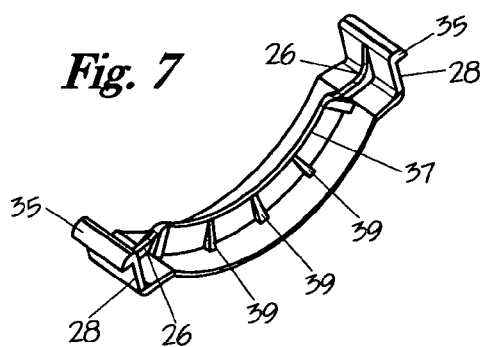
FIG. 7 is a bottom perspective view of the invention's snap clamp.
Figure 8:
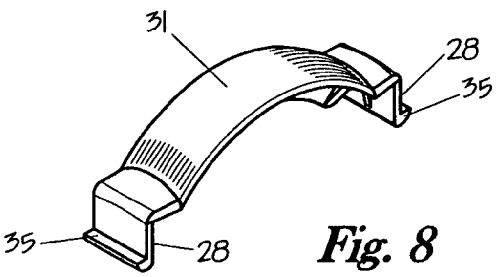
FIG. 8 is a top perspective view of the invention's snap clamp.

Referring to FIGS. 5, 7, and 8, the compression clamp is flanked on both ends by integrally molded insertion tab arms 28. Integral ribs 26 that strengthen the insertion tab arms 28 and stiffen the cantilevered ends of the insertion tab arms create an increased force requirement to initiate deflection of said arms. The insertion tab arms 28 are terminated at the bottom with a shoulder catch tab 35. The horizontal surface of the catch tab 35 bears against the lower surface of the central rail shoulder edge 29 creating a positive locking assembly. The catch tabs 35 are disengaged from the lower bearing surface of the central rail shoulder edge 29 by imparting a pinching deflection force inward towards the midline of the central rail 30 allowing the insertion tab arms to then release upward and away from the central rail 30.

Figure 9:
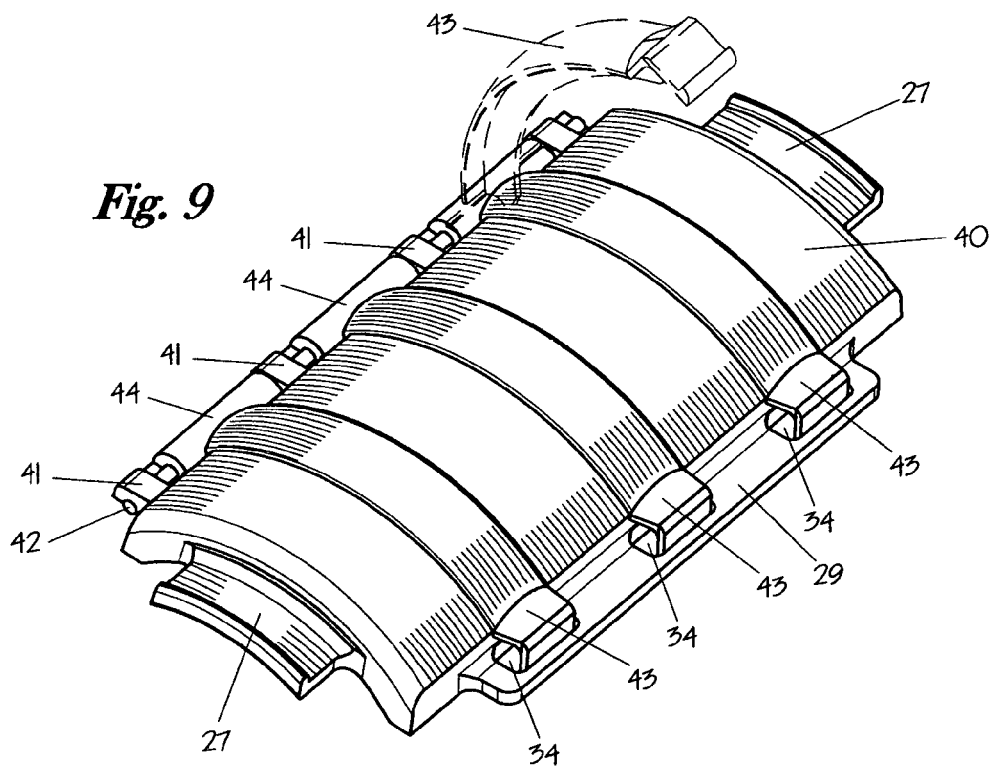
FIG. 9 is a top perspective view of an alternative version of the invention that utilizes a hinged clamp.
Figure 10:
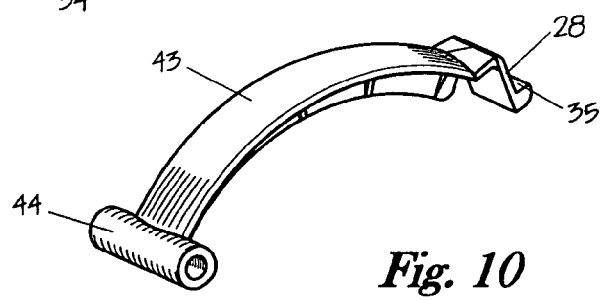
FIG. 10 is a top perspective view of an alternative hinged clamp utilized in the invention illustrated in FIG. 9.

In an alternative embodiment of the invention, the hinged compression clamp 43 is pivotally coupled to the hinged central rail member 40 as illustrated in FIGS. 9 and 10. Hinge pins 42 engage through the compression clamp hinge boss 44 while fixably held within split halves of the central rail hinge bosses 41. In this fashion, the hinged compression clamps 43 remain attached to the hinged central rail 40 at all times resulting in a more efficient manner of loading the gel packets 21 due to the self aligning characteristics of the mechanism.

While the present invention has been illustrated and described herein in what are envisioned and presented to be the most practical and preferred embodiments, it is recognized that departures may be made from this description in a manner consistent with the original spirit and intended scope of the invention. These departures shall therefore not be limited to the details disclosed herein, but are to be afforded the full scope of the claim so as to embrace any and all equivalent arrangements and articles.

What is claimed is:

1. An energy gel pack clamping fixture for securing and transporting a gel pack having a tear tab, the energy gel pack clamping fixture comprising:
    (a) a rigid central rail member made of plastic that is a generally rectangular shaped solid having at least one swept compression gland cavity and mounting tabs on either end of the rail, wherein said mounting tabs are centrally aligned along the longitudinal axis of the central rail and configured to receive a flexible and lockable wrapping strap in an overlapping fashion, wherein said wrapping strap exerts pressure against said mounting tabs towards the surface of a tube member; and
    (b) at least one rigid compression clamp made of plastic and comprised with a matching insertion profile sized to interlock within the swept compression gland cavity of the central rail member; and additionally, said central rail member and said compression clamp further comprising respective offset compression gland surface profiles, each profile comprising at least two direction changes along the profile path of each respective gland surface;
    (a) wherein said direction changes along the profile paths impart at least two pressure bearing surfaces against the gel pack tear tab.
2. The energy gel pack clamping fixture of claim 1, wherein said central rail member further comprising extended shoulder rails on opposite sides along the longitudinal direction of the central rail member, each opposing shoulder rail comprising at least one receiving slot aligned with said swept compression gland cavity.
3. The energy gel pack clamping fixture of claim 2, wherein said rigid compression clamp further comprising opposing insertion tab arms on each end.
4. The energy gel pack clamping fixture of claim 3, wherein said insertion tab arms further comprising shoulder catch at free end of insertion tab arms;
    (a) wherein said shoulder catch engages and snap locks in place against the adjacent receiving slot corner.
5. The energy gel pack clamping fixture of claim 1, wherein said central rail member further comprising:
    (a) an extended shoulder rail on one side along the longitudinal direction of the central rail member, the shoulder rail comprising at least one receiving slot aligned with said swept compression gland cavity; and
    (b) at least one opposing hinge boss along the opposite side of said central rail member aligned with said swept compression gland cavity.
6. The energy gel pack clamping fixture of claim 5, wherein said rigid compression clamp further comprising:
    (a) an insertion tab arm on one end; and
    (b) a hinge boss on the other end.
7. The energy gel pack clamping fixture of claim 6, wherein said compression clamp is pivotally connected to said central rail member.
8. The energy gel pack clamping fixture of claim 7, wherein said insertion tab arm further comprising a shoulder catch at free end of said insertion tab arm;
    (a) wherein said shoulder catch engages and snap locks in place against the adjacent receiving slot corner.

* * * * *